(12) United States Patent
Yamamoto (10) Patent No.: US 9,030,788 B2
(45) Date of Patent: May 12, 2015

(54) POWER SUPPLY SYSTEM FOR VEHICLE (75) Inventor: Akira Yamamoto, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/005,478

(22) PCT Filed: Mar. 31, 2011

(86) PCT No.: PCT/JP2011/058194
§ 371 (c)(1),
(2), (4) Date: Sep. 16, 2013

(87) PCT Pub. No.: WO2012/131969
PCT Pub. Date: Oct. 4, 2012

(65) Prior Publication Data
US 2014/0009855 A1  Jan. 9, 2014

(51) Int. Cl.
H02H 5/04 (2006.01)
B60L 3/00 (2006.01)
H02M 1/32 (2007.01)
B60L 1/00 (2006.01)
B60L 3/04 (2006.01)
B60L 11/12 (2006.01)
B60L 11/14 (2006.01)
H02M 3/337 (2006.01)

(52) U.S. Cl.
CPC .............. *B60L 3/0069* (2013.01); *H02M 1/32* (2013.01); *B60L 1/003* (2013.01); *B60L 3/0046* (2013.01); *B60L 3/04* (2013.01); *B60L 11/123* (2013.01); *B60L 11/14* (2013.01); *H02M 3/3376* (2013.01); *B60L 2210/10* (2013.01); *B60L 2210/40* (2013.01); *Y02T 10/7077* (2013.01); *Y02T 10/7241* (2013.01); *Y02T 10/7022* (2013.01); *Y02T 10/7216* (2013.01); *Y02T 10/6217* (2013.01)

(58) Field of Classification Search
USPC ..................................... 361/23, 42
See application file for complete search history.

(56) References Cited

U.S. PATENT DOCUMENTS

| | | | |
|---|---|---|---|
| 6,917,179 B2 * | 7/2005 | Komatsu et al. | 318/700 |
| 2006/0049797 A1 | 3/2006 | Hope et al. | |
| 2006/0061308 A1 | 3/2006 | Nakayama | |
| 2009/0278547 A1 | 11/2009 | Acena et al. | |
| 2014/0188315 A1 * | 7/2014 | Kang et al. | 701/22 |
| 2014/0292347 A1 * | 10/2014 | Chen, Lihua | 324/509 |

FOREIGN PATENT DOCUMENTS

| | | |
|---|---|---|
| DE | 102009018501 A1 | 12/2009 |
| EP | 1 336 528 A2 | 8/2003 |
| JP | H-11-235024 A | 8/1999 |

(Continued)

OTHER PUBLICATIONS

Bellur, D.M.; Kazimierczuk; M.K.; "DC-DC Converters for Electric Vehicle Applications", IEEE; 2007, pp. 286-293.

*Primary Examiner* — Danny Nguyen
(74) *Attorney, Agent, or Firm* — Sughrue Mion, PLLC (57) ABSTRACT When an earth faulting has occurred in a driving device for driving a motor, a high voltage noise enters a high voltage detector through a connection node of the Y capacitor constituted by a pair of capacitors in DC/DC converter. A controller of the DC/DC converter limits the duty of switching elements constituting a full-bridge circuit on a primary side, in the case where a defect due to an earth faulting of the driving device is detected by a detection value of high voltage detector.

5 Claims, 7 Drawing Sheets (56) References Cited

FOREIGN PATENT DOCUMENTS

| JP | 2000-245146 A | 9/2000 |
|---|---|---|
| JP | 2001-025242 A | 1/2001 |
| JP | 2009-284691 A | 12/2009 |
| JP | 2009-296756 A | 12/2009 |
| JP | 2010-081703 A | 4/2010 |
| JP | 2010-104106 A | 5/2010 |
| JP | 2010-119257 A | 5/2010 |

* cited by examiner

POWER SUPPLY SYSTEM FOR VEHICLE

CROSS REFERENCE TO RELATED APPLICATIONS

This application is a National Stage of International Application No. PCT/JP2011/058194 filed Mar. 31, 2011, the contents of all of which are incorporated herein by reference in their entirety.

TECHNICAL FIELD

The present invention relates to a power supply system for a vehicle, and more particularly to a power supply system for a vehicle including a driving device receiving electric power from an onboard power storage device to generate a vehicle driving force, and an auxiliary machine receiving electric power from the onboard power storage device to operate.

BACKGROUND ART

Conventionally, an electrically powered vehicle such as an electric automobile, a hybrid automobile, and a fuel cell automobile, configured to allow generation of a vehicle driving force by an electric motor, has a configuration equipped with two types of power storage devices including a power storage device (for example, a main battery) storing electric power for driving the electric motor, and a power storage device (for example, an auxiliary machine battery) for driving a low-voltage auxiliary machine. This is because there is a significant difference between an output voltage suitable for driving a traction motor and a rated voltage for an auxiliary machine such as a headlight and air conditioning equipment or for control equipment such as an electric control unit (ECU).

In such a configuration, as disclosed in Japanese Patent Laying-Open No. 2010-104106 (PTD 1), generally, a voltage converter (DC/DC converter) lowers the output voltage of a main battery, and then the output voltage of the DC/DC converter is supplied to an auxiliary machine and an auxiliary machine battery.

This PTD 1 discloses a power supplying device including a power converter converting high-voltage direct current power outputted from a power generating device into low-voltage direct current power, and a battery and an electric load supplied with the electric power converted by the power converter. The power supplying device is provided with a first breaker and a second breaker respectively between the power generating device and an input-side line of the power converter and between an output-side line of the power converter and the battery. According to PTD 1, when an earth faulting or an open circuit failure occurs in the power converter, the first breaker and the second breaker perform breaking operation.

CITATION LIST

Patent Document

PTD 1: Japanese Patent Laying-Open No. 2010-104106
PTD 2: Japanese Patent Laying-Open No. 2010-81703
PTD 3: Japanese Patent Laying-Open No. 2009-296756
PTD 4: Japanese Patent Laying-Open No. 2009-284691

SUMMARY OF INVENTION

Technical Problem

In PTD 1 described above, when an earth faulting or an open circuit failure occurs in the power converter, an electric power supplying path running from the power generating device to the battery is disconnected by the operation of the first breaker and the second breaker, but operation of the electric load can be continued using the electric power stored in the battery.

However, if such a condition continues, discharging from a battery is promoted, thus the output voltage of the battery is lowered. As a result of this, there is a possibility that the electric load cannot be operated properly.

In light of the above, the present invention is directed to solving such a problem, and its object is to provide a power supply system for a vehicle capable of supplying electric power stably to an auxiliary machine even when an earth faulting has occurred in a charging device.

Solution to Problem

According to one aspect of the present invention, a power supply system for a vehicle includes a power storage device, a driving device receiving electric power from the power storage device to generate a vehicle driving force, and an auxiliary machine receiving electric power from the power storage device to operate. The power supply system for a vehicle includes a pair of capacitors connected in series between terminals of the power storage device and having a connection node grounded, a voltage converter lowering an output voltage of the pair of capacitors by a switching operation of a switching element and supplying the voltage to the auxiliary machine, a voltage detector detecting the output voltage of the pair of capacitors, and a controller performing a switching control with respect to the switching element in accordance with a duty set based on a detection value of the voltage detector. The controller performs the switching control with respect to the switching element by limiting the duty when an error is detected in the detection value of the voltage detector due to an earth faulting occurred in the driving device.

Preferably, when the error is detected, the controller fixes the duty at an upper limit value of an allowable range of the duty set in advance in correspondence with an upper limit value of an output voltage range of the pair of capacitors.

Preferably, the controller sets the allowable range of the duty based on a breakdown voltage of at least the switching element.

Preferably, the driving device raises a lower limit value of the output voltage range of the pair of capacitors when the error is detected.

Preferably, the driving device sets the lower limit value of the output voltage range such that the output voltage of the voltage converter in the case of fixing the duty at the upper limit value of the allowable range of the duty becomes greater than the voltage by which a normal operation of the auxiliary machine is ensured.

Advantageous Effects of Invention

According to the present invention, in a power supply system for a vehicle including a driving device receiving electric power from an onboard power storage device to generate a vehicle driving force, and an auxiliary machine receiving electric power from the onboard power storage device to operate, electric power can be stably supplied to the auxiliary machine even when an earth faulting has occurred in the driving device.

DESCRIPTION OF EMBODIMENTS

Hereinafter, embodiments of the present invention will be described in detail with reference to the drawings. The same reference numerals in the drawings indicate the same or corresponding parts.

Figure 1:
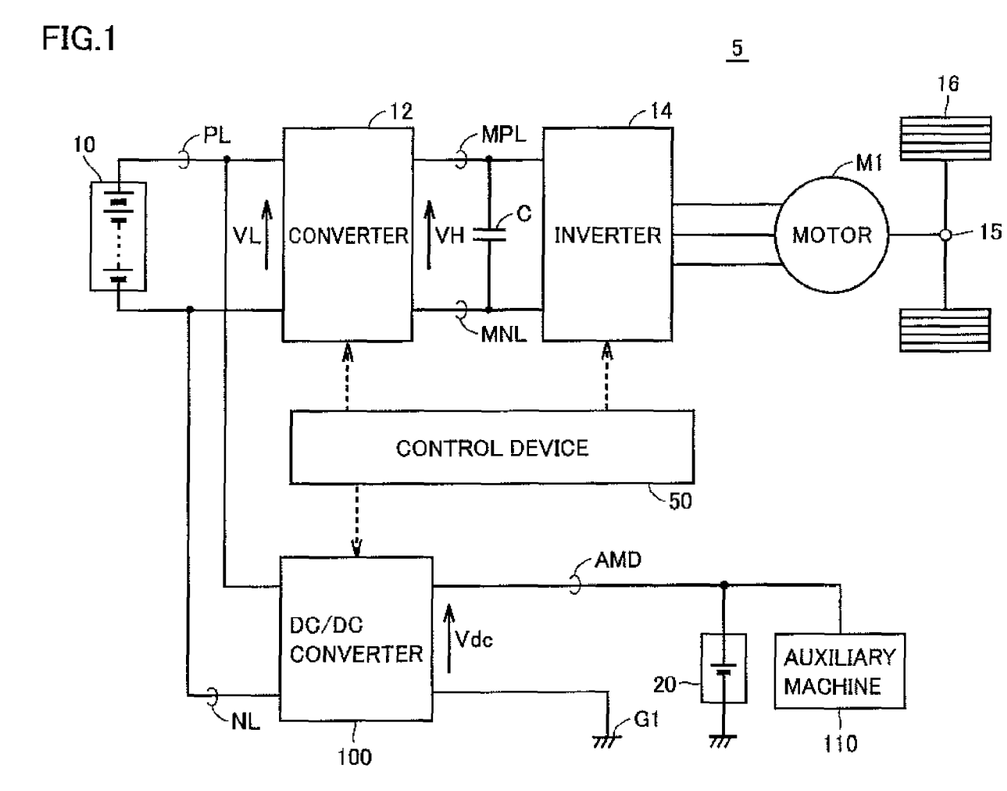
FIG. 1 represents a schematic configuration of an electrically powered vehicle having a power supply system in accordance with an embodiment of the present invention.

FIG. 1 represents a schematic configuration of an electrically powered vehicle having a power supply system in accordance with an embodiment of the present invention.

With reference to FIG. 1, an electrically powered vehicle 5 includes a main battery 10, a converter 12, an inverter 14, a motor M1 for driving a vehicle, a power transmission gear 15, drive wheels 16, and a control device 50. A power supply system for electrically powered vehicle 5 is configured by the parts shown in FIG. 1 excluding motor M1, power transmission gear 15, and drive wheels 16.

Main battery 10 is illustrated as an example of a "power storage device" storing electric power for driving motor M1. Main battery 10 is typically configured by a secondary battery such as a lithium ion battery and a nickel hydride battery. Alternatively, the power storage device may be configured by an electric double layer capacitor, or by a combination of a secondary battery and a capacitor.

Converter 12 is configured to perform a bidirectional direct voltage conversion between voltage VL across a positive line PL and a negative line NL (in other words, the input/output voltage of main battery 10) and a voltage VH across a positive bus line MPL and a negative bus line MNL (in other words, the input voltage of inverter 14). In other words, input/output voltage VL of main battery 10 and direct current voltage VH across positive bus line MPL and negative bus line MNL are boosted or lowered in a bidirectional manner. The voltage boosting and lowering operations in converter 12 are controlled respectively in response to switching commands transmitted from control device 50. Further, between positive bus line MPL and negative bus line MNL, a smoothing capacitor C is connected.

Inverter 14 performs a bidirectional power conversion between direct current power across positive bus line MPL and negative bus line MNL and alternate current power inputted and outputted to and from motor M1. Specifically, inverter 14 converts direct current voltage VH across positive bus line MPL and negative bus line MNL into a three-phase alternate current voltage in response to the switching commands transmitted from control device 15, and supplies the voltage to motor M1. Output torque of motor M1 is controlled by this three-phase alternate current voltage.

The output torque of motor M1 is transmitted to driving wheel 16 through power transmission gear 15 configured by a reducer and a power-split mechanism to allow running of electrically powered vehicle 5. On the other hand, at the time of regenerative braking of electrically powered vehicle 5, motor M1 generates alternate current power along with reduction in the speed of driving wheels 16. At this time, inverter 14 converts the alternate current power generated by motor M1 into the direct current power in response to the switching command transmitted from control device 50, and supplies the power to positive bus line MPL and negative bus line MNL. This direct current power is further supplied to main battery 10 by converter 12. Thus, main battery 10 is charged at the time of reduction in the speed and at the time of running down a slope.

Further, in a hybrid automobile having an engine (not illustrated) in addition to motor M1, a required vehicle driving force for electrically powered vehicle 5 is generated by allowing this engine and motor M1 to operate cooperatively. At this stage, main battery 10 can be charged using electric power generated by rotation of the engine. In other words, electrically powered vehicle 5 collectively represents a vehicle mounted with a traction motor, and includes a hybrid vehicle generating a vehicle driving force by using an engine and an electric motor, an electric automobile having no engine, a fuel automobile, and the like.

Control device 50 is typically configured by an electric control unit (ECU) mainly including a CPU (Central Processing Unit), a memory region such as a RAM (Random Access Memory) and a ROM (Read Only Memory), and an input/output interface. Control device 50 executes a control associated with running of a vehicle and charging/discharging by allowing the CPU to read a program pre-stored in a ROM, place the program on a RAM, and execute the same. At least a part of the ECU may be configured to execute predetermined numerical and logical operation processes by using hardware such as an electronic circuit.

Electrically powered vehicle 5, in addition to the main battery system (hereinafter, referred to as a high voltage system), further includes an auxiliary machine power supply system (hereinafter, referred to as a low voltage system). The high voltage system is insulated from a ground node (vehicle earth) connected to a vehicle body, and on the other hand, the low voltage system is operated using the vehicle earth as a reference.

Specifically, electrically powered vehicle 5 further includes an auxiliary machine battery 20, a DC/DC converter 100, and an auxiliary machine load 110. For example, auxiliary machine battery 20 is configured by a lead battery. The voltage of auxiliary machine battery 20 is lower than the output voltage of main battery 10 and is about 12V, for example. The electric power is supplied from auxiliary machine battery 20 to the auxiliary machine load.

DC/DC converter 100 lowers voltage VL across positive line PL and negative line NL (the output voltage of main battery 10) and outputs the voltage to power supply line AMD. In other words, the output voltage Vdc of DC/DC converter 100 corresponds to the direct current voltage across ground node G1 and power supply line AMD.

Auxiliary machine load 110 is operated with the voltage supplied from power supply line AMD or from auxiliary machine battery 20. Auxiliary machine load 110 includes audio equipment, navigation equipment, and lighting equipment (a hazard lamp, an interior lamp, a head lamp, and the like). Further, auxiliary machine load 110 includes running system loads directly used for running of a vehicle, such as an electric power steering mechanism, an electric oil pump, an electrically controlled small motor, and the like. Control device 50 (ECU) is also operated using electric power supplied from auxiliary machine battery 20 or from power supply line AMD. Auxiliary machine load 110 typically represents these auxiliary machine loads operated using the voltage supplied from power supply line AMD or from auxiliary machine battery 20.

Figure 2:
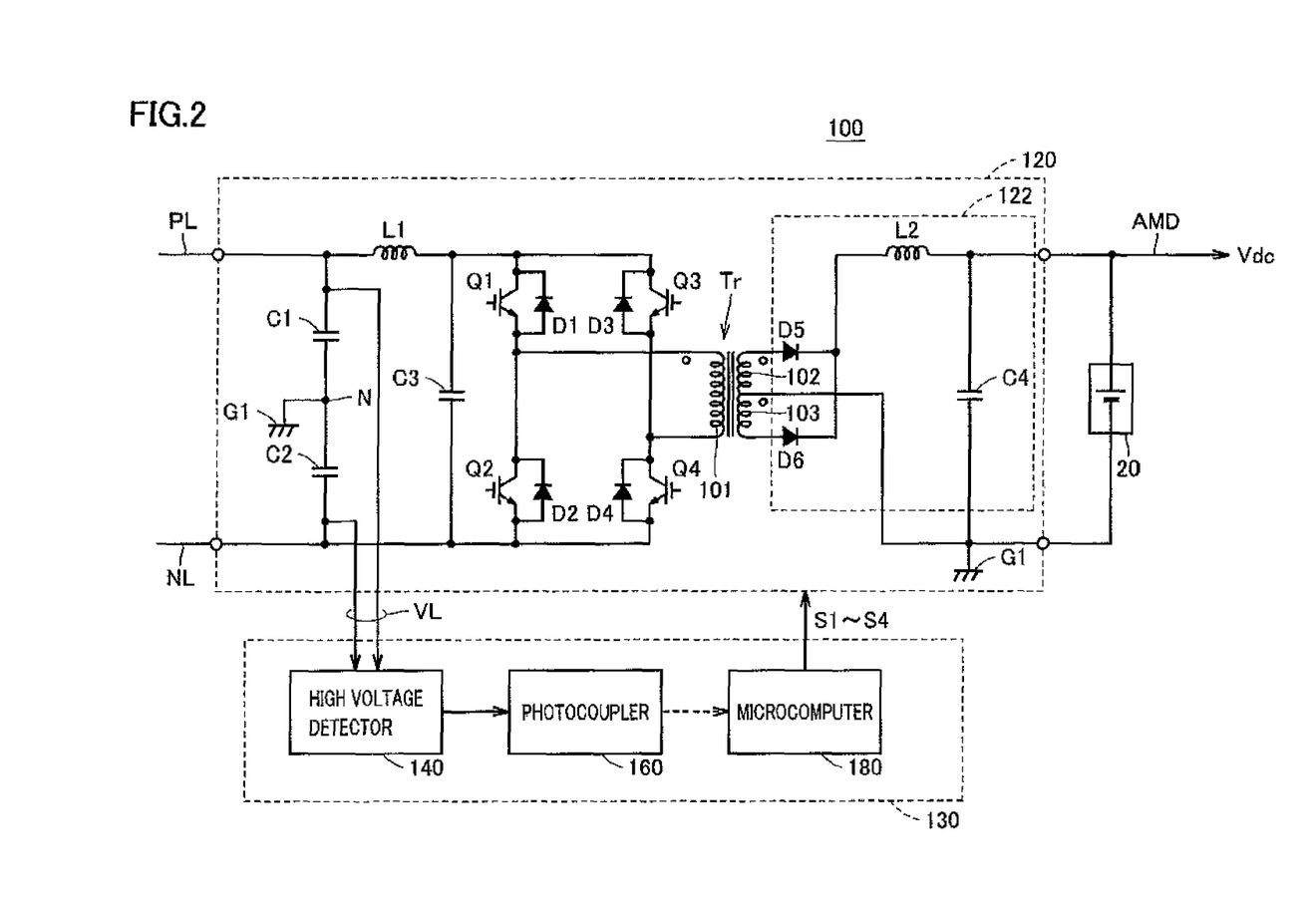
FIG. 2 is a circuit diagram for describing a detailed configuration of a DC/DC converter shown in FIG. 1.

FIG. 2 is a circuit diagram for describing a detailed configuration of DC/DC converter 100 shown in FIG. 1.

Referring to FIG. 2, DC/DC converter 100 is constituted of a converter unit 120, and a controller 130 controlling converter unit 120.

Converter unit 120 includes an inductor L1 with capacitors C1, C2, C3, power semiconductor switching elements Q1-Q4 constituting a full-bridge circuit, a transformer Tr, and a conversion circuit (AC/DC) 122. Anti-parallel diodes D1-D4 are provided corresponding to switching elements Q1-Q4 respectively.

Capacitors C1 and C2 are connected in series between positive line PL and negative line NL, and a connection node (node N) thereof is connected to a ground node G1. Capacitor C1 and capacitor C2 have the same capacitance. A series-connected body of the pair of capacitors C1, C2 constitutes a Y capacitor. The Y capacitor and inductor L1 with capacitor C3 constitute an LC filter. The LC filter suppresses a change in input voltage VL (the voltage across positive line PL and negative line NL) due to superimposition of a common-mode current with respect to positive line PL and negative line NL.

FIG. 2 illustrates transistors as power semiconductor switching elements Q1-Q4 (hereinafter, simply referred to as "switching element"). On/off operations of switching elements Q1-Q4 are controlled in response to signals S1-S4 from controller 130. The full-bridge circuit converts voltage VL from main battery 10 into an alternate current voltage and outputs the voltage to a primary side coil 101 of transformer Tr. In other words, an amplitude, a frequency, and a phase of the alternate current voltage generated in primary side coil 101 can be controlled by switching elements Q1-Q4.

Transformer Tr includes primary side coil 101, secondary side coils 102, 103, and an iron core electro-magnetically connecting primary side coil 101 and secondary coils 102, 103.

In secondary side coils 102 and 103, the alternate current voltage in correspondence with the voltage of primary side coil 101 is generated respectively. An amplitude of the alternate current voltage generated in secondary side coil 102 is determined in accordance with the alternate current voltage of primary side coil 101 and a turn ratio between primary side coil 101 and secondary side coil 102. Similarly, an amplitude of the alternate current generated in secondary side coil 103 is determined in accordance with the alternate current voltage of primary side coil 101 and a turn ratio between primary side coil 101 and secondary side coil 104.

One end of secondary side coil 102 is connected to power supply line AMD through a conversion circuit 122. The other end of secondary side coil 102 is connected to ground node G1. One end of secondary coil 103 is connected to ground node G1, similarly to the other end of secondary side coil 102. The other end of secondary side coil 103 is connected to power supply line AMD through conversion circuit 122, similarly to the one end of secondary side coil 102. The alternate current voltage is transmitted from primary side coil 101 to secondary side coils 102, 103 so that the one end of second side coil 102 and one end of secondary side coil 103, and the other end of secondary side coil 102 and the other end of secondary side coil 103 have the same phase.

Conversion circuit 122 converts the alternate current voltage transmitted to secondary side coils 102, 103 into the direct current voltage and outputs the voltage across power supply line AMD and ground node G1. The direct current voltage converted by conversion circuit 122 corresponds to output voltage Vdc of DC/DC converter 100.

Conversion circuit 122 has diodes D5, D6, inductor L2, and capacitor C4. Diode D5 rectifies the alternate current voltage generated in secondary side coil 102. Diode D6 rectifies the alternative current voltage generated in secondary side coil 103. The voltage rectified by diodes D5, D6 is converted into the direct current voltage by the LC filter with inductor L2 and capacitor C4.

In the configuration described above, the output voltage Vdc of DC/DC converter 100 can be controlled in accordance with an amplitude of the alternate current voltage of primary side coil 101 generated by the full-bridge circuit on the primary side. Therefore, controller 130 controls on/off (duty) of switching elements Q1-Q4 based on comparison between a voltage command value as a target value of output voltage Vdc of DC/DC converter 100 and the voltage of power supply line AMD.

Specifically, controller 130 includes a high voltage detector 140, a photocoupler 160, and a microcomputer 180.

High voltage detector 140 detects voltage VL across terminals of the Y capacitor constituted by the pair of capacitors C1 and C2 (in other words, the voltage across positive line PL and negative line NL) and outputs a detection result to microcomputer 180 through photocoupler 160.

Specifically, high voltage detector 140 includes a PWM (Pulse Width Modulation) circuit (not illustrated). The PWM circuit is constituted by an oscillation circuit oscillating at a constant frequency and a comparator comparing a triangular wave signal generated by the oscillation circuit and an amplitude of voltage VL. PWM circuit modulates the amplitude of voltage VL to obtain a pulse width with a constant amplitude. High voltage detector 140 outputs the pulse signal modulated by PWM circuit to photocoupler 160.

Photocoupler 160 constitutes an insulating circuit providing insulation between the primary side and the secondary side of the transformer Tr. Although not shown, photocoupler 160 includes a light-emitting diode as a light-emitting device, and a photo-transistor as a light receiving device. When the light-emitting diode emits a light beam in response to the pulse signal from high voltage detector 140, the photo-transistor is turned on/off based on the light signal from the light-emitting diode.

Microcomputer 180 acquires a detection value of voltage VL based on the on/off (duty) of the photo-transistor of photocoupler 160. Further, microcomputer 180 acquires a detection value of output voltage Vdc from a low-voltage detector (not illustrated) provided between power supply line AMD and ground node G1. Microcomputer 180 subtracts a detection value of the output voltage Vdc from the voltage command value, and executes a control operation (for example, proportional-integral control) for conforming the output voltage Vdc to the voltage command value. After setting a duty command value based on the calculation result, microcomputer 180 generates signals S1-S4 for controlling on/off of switching elements Q1-Q4 in accordance with the set duty command values and outputs the signals to converter unit 120.

Here, in the switching control for switching elements Q1-Q4, microcomputer 180 sets an upper limit value for duty command values of switching elements Q1-Q4 (hereinafter, referred to as "duty command upper limit value"). The duty command upper limit value is set for avoiding application of the overvoltage to the devices (switching element and diode) provided in DC/DC converter 100. The duty command upper limit value has a variable value in accordance with voltage VL inputted to DC/DC converter 100.

Specifically, the duty command upper limit value is set based on a voltage range of voltage VL across positive line PL and negative line NL. The voltage range of voltage VL is determined in accordance with an output voltage range of main battery 10. The output voltage of main battery 10 varies in accordance with transfer of electric power between main battery 10 and motor M1 in the high voltage system, in other words, charging and discharging of main battery 10. The duty command upper limit value is set to be variable in accordance with voltage VL (in other words, the output voltage of main battery 10) so that the voltage applied to the devices DC/DC converter 100 does not exceed a breakdown voltage of the device.

As described above, by controlling the duty of the switching elements Q1-Q4 within the range not exceeding the duty command upper the limit value set in advance, DC/DC converter 100 can supply the output voltage to auxiliary machine battery 20 and auxiliary machine load 110, while preventing the damage to the devices provided therein.

Figure 3:
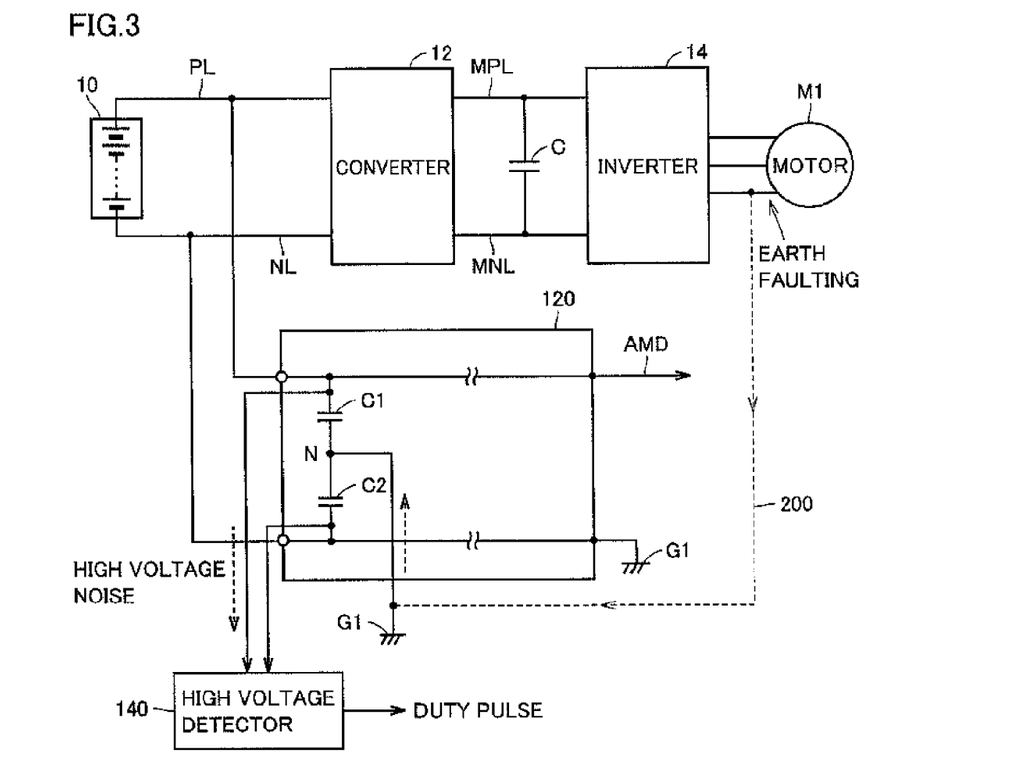
FIG. 3 is a schematic diagram for describing a condition of a low voltage system in a case of an earth faulting occurred in a high voltage system.

However, in electrically powered vehicle 5 as shown in FIG. 1, when earth faulting has occurred, for example, when a power cable supplying electric power to motor M1 or inverter 14 caused a short-circuit with respect to vehicle earth in the high voltage system, an electrical leakage path is formed between the high voltage system and ground node G1. Therefore, an electric potential of ground node G1 is changed. In this case, in the low voltage system operated based on ground node G1, as shown in FIG. 3, the inconvenience of high voltage noise entering into high voltage detector 140 through the connection node (node N) of the Y capacitor connected to ground node G1 occur at DC/DC converter 100.

Figure 4:
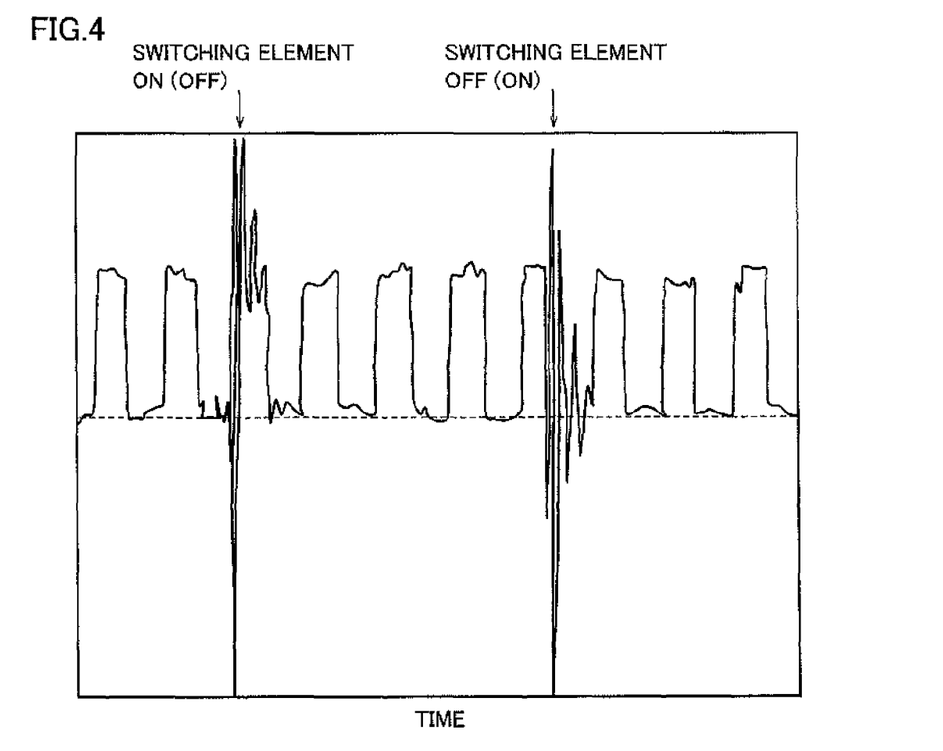
FIG. 4 represents one example of a waveform of a pulse signal outputted from a high voltage detector in a case of an earth faulting occurred in a high voltage system.

FIG. 4 represents one example of a waveform a pulse signal outputted from high voltage detector 140 in a case of an earth faulting occurred in the high voltage system. FIG. 4 assumes the case of an earth faulting occurred in the power cable provided between inverter 14 and motor M1.

Referring to FIG. 4, when the high voltage system is in a normal state, a pulse signal of a duty corresponding to a detection value of voltage VL is output from high voltage detector 140. On the other hand, when an earth faulting has occurred in the power cable, the high voltage noise enters high voltage detector 140 in accordance with change in an electrical potential of ground node G1. The high voltage noise occurs at each timing of turning on or turning off the switching element included in inverter 14. An accurate detection of a detection value of voltage VL by high voltage detector 140 becomes difficult due to effect of the high voltage noise. In this case, a communication error of not being able to transmit the detection value of voltage VL from high voltage detector 140 to microcomputer 180 may occur.

There is a possibility that DC/DC converter 100 outputs the excessively high voltage since converter unit 120 is controlled based on an incorrect voltage detection value when a communication error occurs in high voltage detector 140 as described above. To avoid such a defect, in a conventional power supply system, when a communication error has occurred in the high voltage detector, the output of the voltage of the DC/DC converter is forced to stop by activation of an internal protection function for protecting devices provided in the DC/DC converter or the auxiliary machine load and auxiliary machine battery connected to the DC/DC converter.

Figure 5:
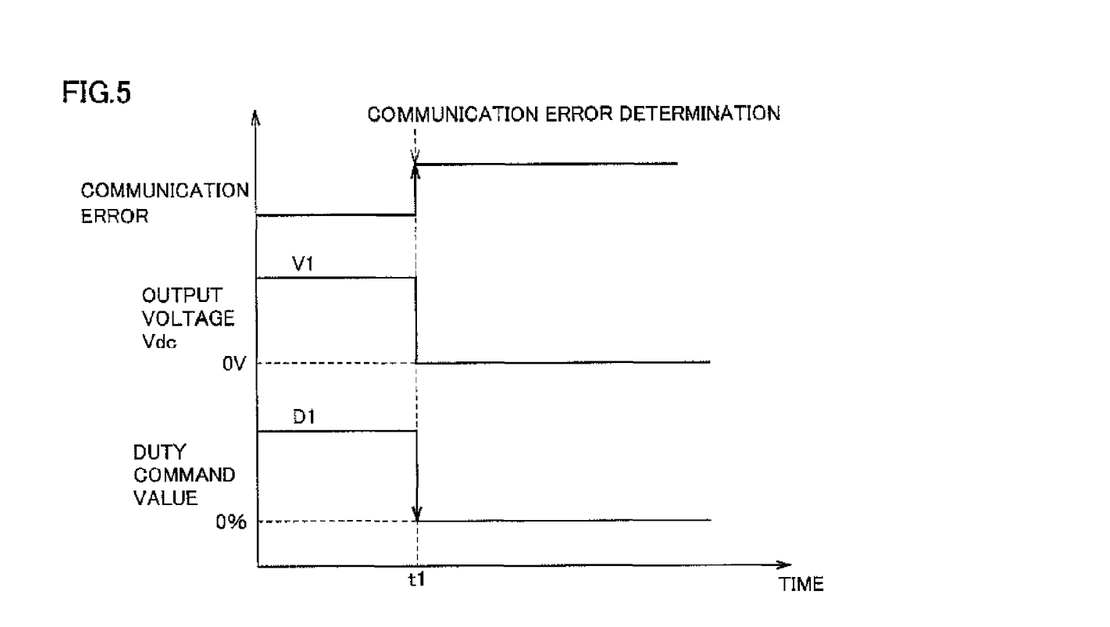
FIG. 5 is a timing chart for describing operation of a DC/DC converter in a case of an earth faulting occurred in a high voltage system of a conventional power supply system.

FIG. 5 is a timing chart for describing an operation of the DC/DC converter in a case where a short-circuit fault has occurred in the high voltage system.

Referring to FIG. 5, when a determined is made that a communication error has occurred in the high voltage detector at the time t1, the controller of the DC/DC converter lowers the duty command value for switching elements Q1-Q4 of the full-bridge circuit on the primary side to be 0 (%). Thus, all of switching elements Q1-Q4 are turned off. Then, output voltage Vdc of the DC/DC converter is lowered to be approximately 0V.

Since auxiliary machine battery 20 cannot be charged by the output voltage Vdc at and after the time t1 of stopping the output of DC/DC converter, discharging of auxiliary battery 20 with respect to power supply line AMD is facilitated. Then, when the output voltage of auxiliary machine battery 20 is lowered by this discharging, a problem is likely to occur in the operation of auxiliary machine load 110.

Here, to solve the problem described above, any countermeasures should be desirably taken to avoid the high voltage noise going into high voltage detector 140. One conceivable example of such countermeasures is to remove the Y capacitor forming a entry passage for the high voltage noise at the time of occurrence of an earth faulting from DC/DC converter 100. However, removing the Y capacitor causes the so-called radio noise to increase in the case where the stray capacitance between the high voltage system and the vehicle earth is small, thus negative effect with respect to onboard electronic equipment including control device 50 is concerned.

Alternatively, reinforcing a filter provided inside DC/DC converter 100 is conceivable. Reinforcing the filter can block the high voltage noise from entering, but on the other hand, detection sensitivity of high voltage detector 140 is likely to be lowered.

In light of the above, in the power supply system according to the present embodiment, DC/DC converter 100 is operated with a limited output in a case where a communication error has occurred in high voltage detector 140. Specifically, the output of DC/DC converter 100 is limited to a level at least capable of assuring protection for devices provided in DC/DC converter 100.

Figure 6:
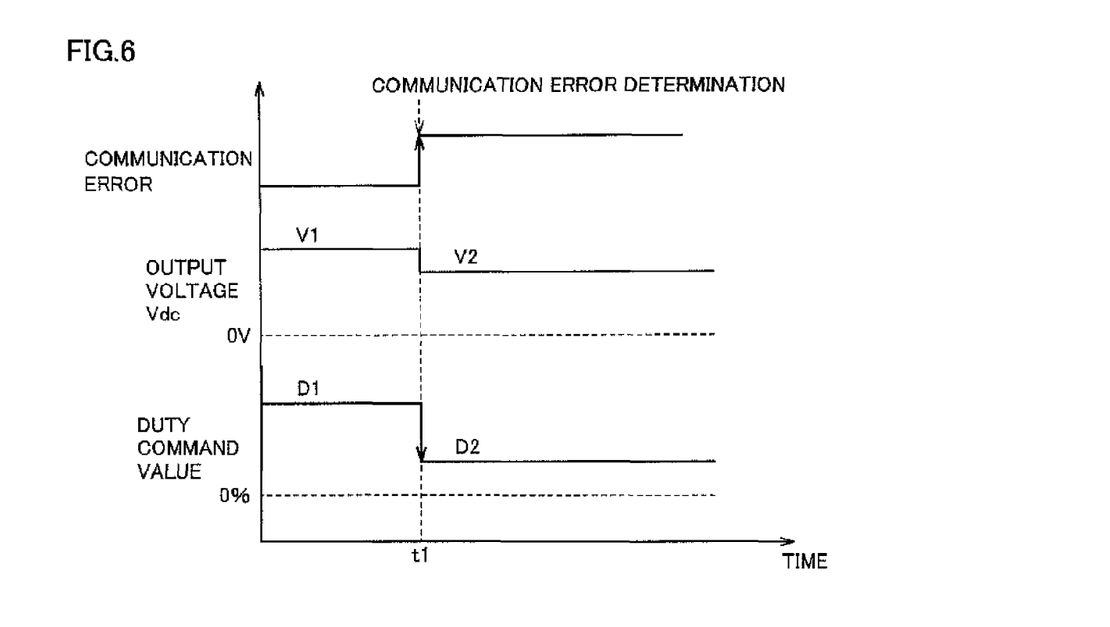
FIG. 6 is a timing chart for describing operation of a DC/DC converter in a case of an earth faulting occurred in a high voltage system of a power supply system in accordance with an embodiment of the present invention.

FIG. 6 is a timing chart for describing operations of DC/DC converter 100 in the case of an earth faulting occurred in the high voltage system of the power supply system in accordance with the embodiment of the present invention.

Referring to FIG. 6, when a determination is made that a communication error has occurred in high voltage detector 140 at the time t1, controller 130 of DC/DC converter 100 fixes the duty command value for switching elements Q1-Q4 of the full-bridge circuit on the primary side at a predetermined value D2 (%). Thus, the output voltage Vdc of DC/DC converter 100 is lowered to a predetermined voltage V2.

Predetermined voltage V2 is determined in accordance with voltage VL, duty command value D2, and a turn ratio between primary side coil 101 and secondary side coil 102.

Figure 7:
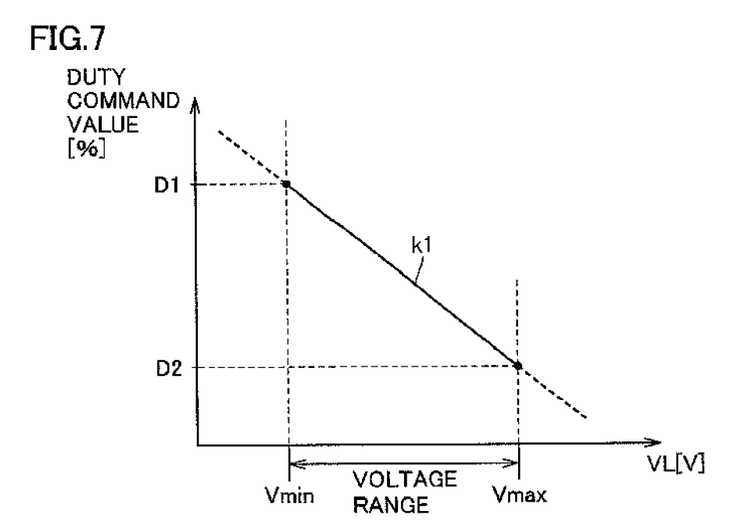
FIG. 7 is a diagram for describing an allowable range of duty command values.

Here, predetermined value D2 (%) of the duty command value is set based on an allowable range of the duty command corresponding to the maximum output voltage of main battery 10. FIG. 7 is a diagram for describing the allowable range of the duty command values. In FIG. 7, the horizontal axis represents voltage VL input to DC/DC converter 100, and the vertical axis represents the duty of switching elements Q1-Q4 of the full bridge circuit on the primary side. Voltage VL is a voltage across positive line PL and negative line NL and corresponds to the output voltage of main battery 10.

Referring to FIG. 7, voltage VL has a predetermined voltage range corresponding to a variation range of the output voltage of main battery 10 in a charge-discharge control for main battery 10. Hereinafter, an upper limit of the voltage range will be referred to as Vmax (voltage upper limit value), and a lower limit of the voltage range will be referred to as Vmin (voltage lower limit value).

An allowable range of the duty command value for switching elements Q1-Q4 is set in correspondence with the voltage range of voltage VL. Specifically, the upper limit value of the allowable range of the duty command values (in other words, the duty command upper limit value) is variably set in accordance with voltage VL so that the voltage applied to the devices (a switching element and diode) in converter unit 120 does not exceed the breakdown voltages of these devices. The line k1 in the drawing represents a relationship between voltage VL and the duty command upper limit value.

According to this relationship, when voltage VL has voltage lower limit value Vmin, the duty command upper limit value is set to be D1 (%). On the other hand, when voltage VL has the voltage upper limit value Vmax, the duty command upper limit value is set to be D2 (%) smaller than D1 (%). As described above, variably setting the duty command upper limit value in accordance with the voltage range of voltage VL can avoid application of excessive voltage to the devices in DC/DC converter 100 even in a case where voltage VL is changed along with charging and discharging of main battery 10.

Then, when a determination is made that a communication error has occurred in high voltage detector 140, controller 130 fixes the duty ratio at the duty command upper limit value D2 obtained when voltage VL has the voltage upper limit value Vmax. Since a communication error is likely to cause transmission of an incorrect voltage detection value from high voltage detector 140, the duty ratio is limited under assumption that voltage VL has the upper limit value Vmax regardless of a voltage detection value. Thus, after determination of a communication error is made, application of the voltage exceeding the breakdown voltage to the internal element can be reliably avoided even in the case where voltage VL equal to voltage upper limit value Vmax is inputted to DC/DC converter 100.

As described above, according to the power supply system in accordance with the embodiment of the present invention, operation of DC/DC converter can be continued even in the case where a communication error has occurred in high voltage detector 140 of DC/DC convert 100 due to an earth faulting occurred in the high voltage system. Particularly, limiting the duty command allows DC/DC converter 100 to continue outputting electric power to power supply line AMD without damaging the devices inside. As a result, the output voltage of DC/DC converter can be supplied to auxiliary machine battery 20 and auxiliary machine load 110 also in a case where the output voltage of auxiliary machine battery 20 is lowered in correspondence with the operation of auxiliary machine load 110.

[Modified Embodiment]

Figure 8:
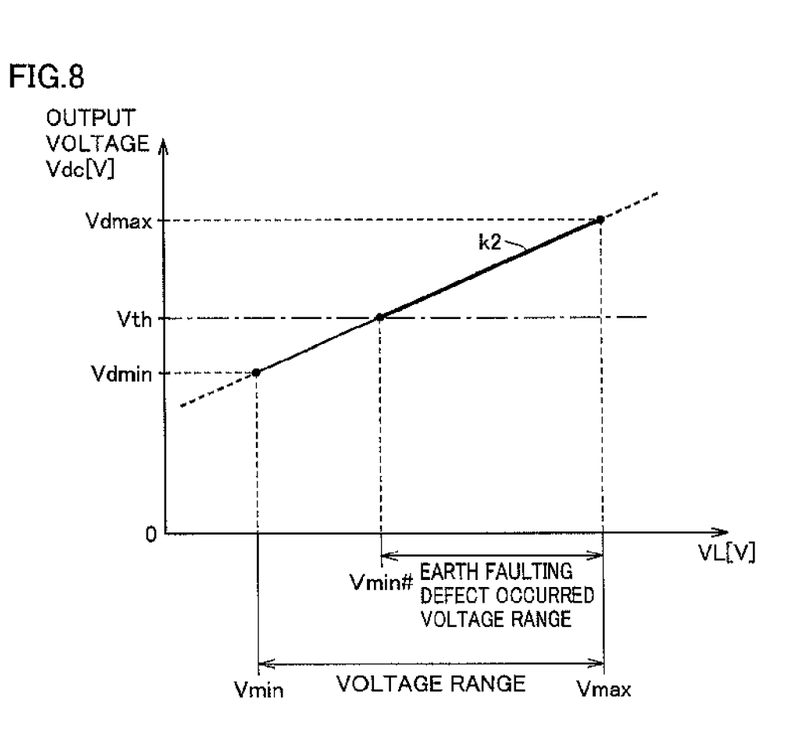
FIG. 8 is a diagram for describing operation of a DC/DC converter in a power supply system in accordance with a modified embodiment of the present invention.

As described above, fixing the duty at the duty command upper limit value D2 obtained when voltage VL has the voltage upper limit value Vmax allows the output voltage Vdc of DC/DC converter 100 to be lowered along with lowering of voltage VL is lower, as indicated by the line k2 in FIG. 8. In other words, the output voltage Vdc becomes the maximum when voltage VL has the upper limit value Vmax of the normal voltage range (Vdc=Vdmax), and becomes the minimum when voltage VL has the lower limit value Vmin of the normal voltage range (Vdc=Vdmin). Therefore, the output voltage Vdc is likely to be lower than the voltage ensuring normal operation of auxiliary machine load 110 (refer to threshold voltage Vth in the drawing).

To avoid such a defect, in a case where a communication error has occurred in high voltage detector 140, lower limit value Vmin of the voltage range of voltage VL may be set higher. Specifically, as shown in FIG. 8, a lower limit value Vmin# of the voltage range of voltage VL is set to be voltage VL corresponding to the output voltage Vdc with the threshold value Vth. Thus, charge-discharge control of main battery 10 is performed so that voltage VL (the output voltage of main battery 10) falls within the limited voltage range. Consequently, DC/DC converter 100 can continue outputting the voltage that ensures the normal operation of auxiliary machine load 110 to power supply line AMD without damaging the devices provided inside.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

Industrial Applicability

The present invention can be applied to a vehicle having a power storage device, a driving device receiving electric power from the power storage device to generate a vehicle driving force, and an auxiliary machine receiving electric power from the power storage device to operate.

Reference Signs Lists 10 main battery; 12 converter; 14 inverter; 15 power transmission gear; 16 driving wheels; 20 auxiliary machine battery; 50 control device; 100 DC/DC converter; 101 primary side coil; 102-104 secondary side coil; 110 auxiliary machine load; 120 converter unit; 122 conversion circuit; 130 controller; 140 high voltage detector; 160 photocoupler; 180 microcomputer; AMD power supply line; C, C1-C4 capacitors; D1-D6 diodes; L1, L2 inductor; M1 motor; MNL negative bus line; MPL positive bus line; NL negative line; PL positive line; Q1-Q4 switching elements.

The invention claimed is:

1. A power supply system for a vehicle including a power storage device, a driving device generating a vehicle driving force with power received from said power storage device and an auxiliary machine operated with power received from said power storage device, said power supply system comprising:
    a pair of capacitors connected in series between terminals of said power storage device and having a connection node grounded;
    a voltage converter lowering an output voltage of said pair of capacitors by a switching operation of a switching element and supplying the voltage to said auxiliary machine;
    a voltage detector detecting an output voltage of said pair of capacitors; and
    a controller performing a switching control with respect to said switching element in accordance with a duty set based on a detection value of said voltage detector,
    said controller performing the switching control with respect to said switching element by limiting said duty when an error caused by earth faulting occurred in said driving device is detected by a detection value of said voltage detector.

2. The power supply system for vehicle according to claim 1, wherein, when said error is detected, said controller fixedly sets said duty at an upper limit value of an allowable range of said duty set in advance in correspondence with an upper limit value of an output voltage range of said pair of capacitors.

3. The power supply system for vehicle according to claim 2, wherein said controller sets said allowable range of the duty based on a breakdown voltage of at least said switching element.

4. The power supply system for vehicle according to claim 2, wherein said driving device raises a lower limit value of the output voltage range of said pair of capacitors when said error is detected.

5. The power supply system for vehicle according to claim 4, wherein said driving device sets the lower limit value of said output voltage range such that the output voltage of said voltage converter corresponding to when the duty is fixed at the upper limit value of said allowable range of the duty becomes greater than the voltage by which a normal operation of said auxiliary machine is ensured.

* * * * *